United States Patent [19]

Gao et al.

[11] Patent Number: 5,443,660
[45] Date of Patent: Aug. 22, 1995

[54] WATER-BASED NO-CLEAN FLUX FORMULATION

[75] Inventors: Guilian Gao, Novi; Jay D. Baker, Dearborn; Brenda J. Nation, Troy; Karen M. Adams, Dearborn Heights, all of Mich.

[73] Assignee: Ford Motor Company, Dearborn, Mich.

[21] Appl. No.: 327,941

[22] Filed: Oct. 24, 1994

[51] Int. Cl.⁶ .............................................. B23K 35/34
[52] U.S. Cl. ...................................... 148/24; 148/23; 148/25; 228/223
[58] Field of Search .................... 148/23-25; 228/223

[56] References Cited

U.S. PATENT DOCUMENTS

| | | | |
|---|---|---|---|
| 2,581,820 | 1/1952 | Stright | 148/23 |
| 2,980,562 | 4/1961 | Matter et al. | 148/23 |
| 3,837,932 | 9/1974 | Aronberg | 148/23 |
| 3,925,112 | 12/1975 | Petersen, Sr. et al. | 148/25 |
| 4,070,192 | 1/1978 | Arbib et al. | 106/1.05 |
| 4,098,621 | 7/1978 | Strauss et al. | 148/23 |
| 4,360,392 | 11/1982 | Roberts | 148/23 |
| 4,419,416 | 12/1983 | Gupta et al. | 428/656 |
| 4,428,780 | 1/1984 | Shedroff | 148/23 |
| 4,460,414 | 7/1984 | Hwang | 148/23 |
| 4,762,573 | 8/1988 | Biverstedt | 148/23 |
| 4,954,184 | 9/1990 | Conn | 148/24 |
| 4,994,119 | 2/1991 | Gutierrez et al. | 148/23 |
| 4,995,921 | 2/1991 | Davis et al. | 148/22 |
| 5,004,509 | 4/1991 | Bristol | 148/23 |
| 5,041,169 | 8/1991 | Oddy et al. | 148/23 |
| 5,064,482 | 11/1991 | Goobich | 148/24 |
| 5,085,365 | 2/1992 | Turner | 228/223 |
| 5,092,943 | 3/1992 | Davis | 148/24 |
| 5,094,701 | 5/1992 | Norman | 148/24 |

OTHER PUBLICATIONS

Product Information on Tergitol TMN-6 (90% Aqueous) Surfactant, by Union Carbide Chemicals and Plastics Company Inc., Industrial Chemicals Division, Copyright 1989, pp. 1-5, 13.

Material Safety Data Sheet on Alpha 4942 flux, by Alpha Metals, Jersey City, N.J., Revision date Nov. 6, 1992, 6 pgs.

*Primary Examiner*—Peter D. Rosenberg
*Attorney, Agent, or Firm*—Roger L. May; Joseph W. Malleck

[57] ABSTRACT

A no-VOC or low-VOC no-clean flux formulation for use in the assembly of electronic circuit boards having a conformal coating. The formulation comprises a solvent, a water-soluble weak organic acid, a halide-free, non-ionic surfactant, and a biocidal co-solvent. The formulation is compatible with the conformal coating, permits no or low VOC emissions into the environment, and eliminates post-soldering cleaning steps.

16 Claims, No Drawings

WATER-BASED NO-CLEAN FLUX FORMULATION

TECHNICAL FIELD

The invention relates to a flux composition for use in the assembly of electronic circuit boards.

BACKGROUND ART

In the electronics industry, solders are used for assembling electronic circuit boards. To function effectively, solder must wet the substrate with a strong, permanent bond to be formed. Often, a flux is used to enhance the task of wetting the substrate. The ability to remove the surface oxide films from the substrate is another desirable characteristic of a flux. The constituents of most fluxes are therefore often both corrosive and ionically conductive.

Solder joints form interconnections between various levels of an electronic package. These joints are made between solderable metallized surfaces, such as Cu, Cu plated with Pb-Sn, Ni, or Ni plated with Au. The metallized layers are typically heavily contaminated with metal oxides, carbon compounds, and other materials due to extended exposure in the manufacturing environment. A metal surface contaminated by these materials cannot be wet by solder. However, once this surface contamination is removed, the solder wets the metallization and forms a metallurgically sound solder joint, which will both hold the various electronic components in place and pass electrical signals.

Historically, oxides have been removed from metallized surfaces using solder processes by the application of liquid fluxes. Flux (from the latin term meaning "to flow") is applied to a surface to assist in wetting by the solder. Conventionally, a flux consists of active agents dissolved or dispensed in a liquid carrier. The carrier for flux is typically alcohol-based, with varying concentrations of acids or salts as activators. The function of the activators is to reduce base metal oxides. The activators most commonly used in fluxes are: abietic acid (also present in rosin), adipic acid, and amine salts.

The purpose of a flux is to:

(1) remove the oxide from the metallization;

(2) remove the oxide on the molten solder to reduce the surface tension and enhance flow;

(3) inhibit subsequent oxidation of the clean metal surfaces during soldering; and (4) assist in the transfer of heat to the joint during soldering.

After a solder joint is formed, a flux residue remains. The residue consists of a carrier, such as rosin or resin that is not evaporated, acid or salt deposits, and the removed oxides. The residue can be deleterious to the long-term reliability of an electronic package if it is not removed. The resin can absorb water and become an ionic conductor which could result in electrical shorting and corrosion. The residual activator can, over a period of time, corrode the soldered components and cause electrical opens. Furthermore, the flux residue, which still covers the entire assembly, is present not only on the surface, but also underneath the components where inspection is difficult and the residue is hard to remove.

The current practice is to either select a no-clean flux or use post-soldering cleaning to remove the flux residue.

The use of fluxes which leave a benign flux residue can avoid cleaning after soldering. However, most of no-clean fluxes available today contain a very high percentage of volatile organic compounds (VOCs), such as isopropanol, which are emitted to the environment during the soldering process. VOCs are harmful to the environment and are regulated by the EPA and many states.

If fluxes which leave corrosive and/or hygroscopic residues are used, post soldering cleaning using chlorinated fluorocarbons (CFCs), organic solvents, semi-aqueous solutions, or water is required. For this type of process, in addition to VOC emissions from the soldering process, the cleaning process results in emission of CFCs and waste water. All add to environmental pollution and production costs.

It is known that microorganisms (microbes, e.g. bacterial, fungi, and molds) may grow in aqueous-based fluxes. The microbes most likely are spawned from inadvertent contamination by sources in the environment: dust and dirt particles, for example, carry common soil bacteria.

Microbial contamination and fluxes could, under some circumstances, adversely affect the soldering process. For example, microbial growth consumes adipic acid, converting it to a biomass, $CO_2$, and possibly partially oxidized products of adipic acid. Accordingly, there is a concern that solderability could be inhibited by contaminated flux forming a coating of biomass or biomaterials such as protein before contact with a solder wave. Additionally, post-solder microbial residues could impact electrical reliability and conformal coat adhesion. Further, microbial consumption of adipic acid could deactivate the flux.

One approach to ameliorating this problem is the use of certain biocidal chemicals. However, many such chemicals known today tend to have a very low human exposure limit and result in ionic or halide residues.

One approach is suggested by U.S. Pat. No. 5,085,365. That reference discloses a non-toxic, noncorrosive liquid soldering flux comprising an organic acid and a non-toxic carrier, such as water. The flux requires cleaning after soldering with deionized water, or other solvents, which generates waste requiring disposal. U.S. Pat. No. 4,360,392 discloses a solder flux composition having as a solvent a mixture of water and one or more aliphatical alcohols. U.S. Pat. No. 2,581,820 discloses the use of distilled water in a soldering flux. U.S. Pat. No. 4,994,119 discloses a water-soluble soldering flux containing deionized water as the solvent. U.S. Pat. No. 3,925,112 discloses that a bacteriostatic agent may be added to a water-based flux.

SUMMARY OF THE INVENTION

It would be desirable to make available a flux system which emits no or very low VOCs during soldering, leaves a benign residue after soldering and thus does not require post-soldering cleaning. In addition, to reduce concerns over worker safety, it would be desirable to use a flux which is not flammable. Materials and energy associated with cleaning would be conserved and pollution plus waste including volatile organic compounds (VOC) emissions, chlorofluorocarbon (CFC) emissions, and waste water treatment are prevented. In regions with strict VOC emission regulations, use of a non-VOC or low VOC no-clean flux may be the only means of compliance. To reduce concerns over worker safety, it would therefore be desirable in combating microbial growth to use a biocidal chemical with higher human exposure limits, such as IPA.

The invention is a flux formulation for use in the assembly of electronic circuit boards having a conformal coating. The formulation comprises a solvent, a water-soluble weak organic acid, a halide-free, non-ionic surfactant, and a biocidal co-solvent. The formulation is compatible with the conformal coating which encapsulates the electronic circuit board. Use of the disclosed flux formulation serves to eliminate or minimize VOC emissions during fluxing and soldering, and serves to dispense with post-soldering cleaning steps and waste disposal problems related thereto.

The inventors have found that by using the flux formulation of the present invention, there is no inhibition to curing silicone conformal coatings containing a platinum catalyst which encapsulate the circuit board. This type of coating is very sensitive to flux residues. The flux is also expected to be compatible with other types of coatings which are more tolerable towards flux residues such as UV cured silicone and polyurethane. Any benign flux which remains will not impair the integrity of bonding between the conformal coating and the board assembly.

BEST MODE(S) FOR CARRYING OUT THE INVENTION

The flux formulation of the invention includes a solvent, a water-soluble, weak organic acid, a halide-free, non-ionic surfactant, and a biocidal co-solvent. The formulation is compatible with the conformal coating which encapsulates the electronic circuit board. Additionally, the flux formulation eliminates or minimizes environmental and no post-soldering cleaning steps are needed.

The disclosed soldering flux is used for soldering lead/tin solders to lead/tin or copper metals for printed circuit boards, although the disclosed formulation may be suitable for other applications.

The solvent comprises mostly deionized water. Other suitable solvents include alcohol and ether. Preferably, the organic acid comprises adipic acid: $HOOC(CH_2)_4COOH$. Other organic acids may be used. They include maleic acid, succinic acid, and glutaric acid.

The surfactant comprises an alcohol ethoxylate, such as Tergitol TMN-6 (90% aqueous), which is available from Union Carbide Corporation. Its general structural formula is: $C_2H_2O(CH_2CH_2O)_nH$. AS the example to be described below confirms, this surfactant is one of the most effective non-ionic wetting agent and penatrant available. It has good solvency and grease-cutting ability. While Tergitol TMN-6 is preferred, other surfactants may be used. They include glycol esters, glycerides, and other carboxylated non-ionics. The surfactant is hygroscopic. Accordingly, the conformal coating serves to protect the electronic circuit board from damage caused by absorption of moisture.

Preferably, the co-solvent comprises an aliphatic alcohol, such as isopropanol. Other suitable co-solvents include ethanol, butanol, and pentanol.

To meet the desirable objective of leaving no corrosive residues, the disclosed flux formulation uses relatively low concentration and benign active agents.

The inventors have found that the specific surfactants selected in the proportion ranges disclosed tends to lower surface tension so that water may wet an underlying circuit board. If more than the disclosed proportions are used, a residue remains which if not washed away may produce deleterious effects over time. For example, residues may be hygroscopic and promote electromigration.

The inventors contemplate that the flux formulation of the present invention may because of its benign character, be allowed to remain on the printed circuit board. Because the flux may be allowed to remain on the board, cleaning steps are also ameliorated. Related expenses, and waste disposal problems are thereby avoided.

To test electronic reliability and compatibility of fluxes with conformal coatings, a biased pressure cooker procedure was used. The purpose of testing was to ensure product reliability in the harsh environment to which automotive electronics are exposed. An experimental procedure used interdigitated test patterns. Fluxes were sprayed onto a test pattern and heat treated to simulate an actual soldering heat profile. A conformal coating was then applied on top of the flux residue and cured. After curing, the test patterns were subjected to a high temperature and high humidity environment inside a pressure cooker for a given period. A voltage bias was applied between the interdigitated fingers to promote electromigration and dendritic growth. Test patterns were then measured electrically to determine the number of patterns shorted by metallic dendrites formed during the accelerated test. If any short was detected, the flux and the conformal coating were considered as not compatible.

In the experiments to be described below, the conformal coating was a silicone coating. It is a heat-cured material which contains a platinum catalyst.

The various formulations listed below of water-based, no-clean fluxes were tested for compatibility with the conformal coating:

TABLE I

| Activator (wt %) | Solvents (vol %) | Surfactant | Compatible? |
| --- | --- | --- | --- |
| 1% malonic acid | 25% IPA, 75% DI water | None | No |
| 1% adipic acid | 15% IPA, 85% DI water | None | No |
| 1% adipic acid | 30% IPA, 70% DI water | None | No |
| 1% adipic acid | 50% IPA, 50% DI water | None | No |
| 0.75% adipic acid | 15% IPA, 85% DI water | None | No |
| 0.5% adipic acid | 15% IPA, 85% DI water | None | No |
| 0.5% adipic acid 0.5% pimelic acid | 15% IPA, 85% DI water | None | No |
| 1% adipic acid | DI water | None | No |
| 1% adipic acid | DI water | 0.02% Triton DF-16 | No |
| 1% adipic acid | DI water | 0.05% Triton DF-16 | No |
| 1% adipic acid | 10% IPA, 90% DI water | 0.02% Triton TMN-6 | No |
| 1% adipic acid | 5% IPA, 95% DI water | 0.01% Tergitol TMN-6 | No |
| 1% adipic acid | 5% IPA, 95% DI water | 0.05% Tergitol TMN-6 | No |

TABLE I-continued

| Activator (wt %) | Solvents (vol %) | Surfactant | Compatible? |
|---|---|---|---|
| 1% adipic acid | 5% IPA, 95% DI water | 0.02% Tergitol TMN-6 | Yes |

As the above results show, the only formulation which passed the stringent compatibility tests was that which contains 1% adipic acid; 95% (vol.) deionized water; 5% (vol.) isopropanol; and 0.02% Tergitol TMN-6. Tergitol TMN-6 is available from Union Carbide. Its chemical family is alcohol ethoxylates. Its chemical name is 2,6,8-Trimethyl-4-Nonyloxypolyethyleneoxyethanol. The isopropyl alcohol is also known as isopropanol, true-propanol, SEC-propyl alcohol, dimethyl carbinol, isohol, petrohol.

Using the disclosed flux formulations, a solderability test was conducted by soldering current electronic engine control modules assembled through wave soldering. The flux was sprayed using the production system currently used. The modules were soldered with the current production heat profile in an inert gas wave soldering machine manufactured by Electrovert. Solder joint quality was examined using an opticalmicroscope and compared to soldered joints produced with current production no-clean fluxes. The results indicated that solderability of the waterbased flux is comparable to the current production noclean flux formulation.

In light of the above-noted disclosure, it will be apparent that the disclosed flux formulation is a non-VOC or low-VOC rosin/resin-free, no-clean flux. It is water based. It contains no volatile low boiling point solvents, and can optionally contain less than 10% VOC with a biocidal effect, such as IPA thereby eliminating the VOC emission issue. The disclosed formulation has no flammability.

All percentages or proportions set forth herein are by weight, unless specifically indicated otherwise.

We therefore claim:

1. A flux formulation for use in the assembly of electronic circuit boards having a conformal coating, the formulation comprising:
   a solvent;
   a water-soluble weak organic acid;
   a halide-free non-ionic surfactant; and
   a biocidal co-solvent, the formulation being compatible with the conformal coating, the formulation allowing elimination of post-soldering cleaning steps and emitting no or low VOCs into the environment during fluxing and soldering, thereby providing a non-VOC or low-VOC, no-clean flux.

2. The flux formulation of claim 1, wherein the solvent comprises water.

3. The flux formulation of claim 1, wherein the organic acid comprises adipic acid.

4. The flux formulation of claim 1, wherein the surfactant comprises an alcohol ethoxylate.

5. The flux formulation of claim 1, wherein the co-solvent comprises isopropanol.

6. A flux formulation of claim 1 comprising:
   at least 90% of solvent, wherein the solvent includes deionized water;
   up to 5% of organic acid, wherein the organic acid includes adipic acid;
   up to 5% or a halide-free, non-ionic surfactant wherein the surfactant includes Tergitol TMN-6;
   up to 10% of a biocidal co-solvent, wherein the co-solvent includes isopropanol.

7. The flux formulation of claim 6 comprising:
   94% of deionized water;
   1% of adipic acid;
   from 0.01–1.0% Tergitol TMN-6 surfactant; and
   5% (vol.) of isopropanol.

8. A method for soldering comprising:
   providing a soldering flux formulation;
   heating components to be soldered to a desired soldering temperature; and
   applying solder and a flux to the surface to be soldered, the flux comprising:
   a solvent;
   a water-soluble weak organic acid;
   a halide-free, non-ionic surfactant; and
   a biocidal co-solvent, the formulation being compatible with a conformal coating which encapsulates an electronic circuit board, the formulation allowing elimination of post-soldering cleaning steps, and the formulation emitting no or low VOCs into the environment during fluxing and soldering.

9. The method of claim 8, wherein the solvent is deionized water.

10. The method of claim 9, wherein the organic acid is adipic acid.

11. The method of claim 10, wherein the surfactant is Tergitol TMN-6.

12. The method of claim 11, wherein the cosolvent is isopropanol.

13. The method of claim 8, wherein the concentration of solvent is less than or equal to 94%.

14. The method of claim 8, wherein the concentration of adipic acid is less than or equal to 5%.

15. The method of claim 8, wherein the concentration of the surfactant is 0.01–5%.

16. The method of claim 8, wherein the concentration of isopropanol is less than or equal to 10%.

* * * * *